United States Patent [19]

Thaw et al.

[11] 3,995,404
[45] Dec. 7, 1976

[54] ATTACHMENT FOR HOLLOW WALLS AND METHOD OF REPAIRING SAME

[75] Inventors: Allan Thaw, Massapequa Park; John Milcetich, Huntington Station, both of N.Y.

[73] Assignee: Mechanical Plastics Corporation, Farmingdale, N.Y.

[22] Filed: Mar. 5, 1975

[21] Appl. No.: 555,443

[52] U.S. Cl. .................................. 52/514; 52/509; 52/98
[51] Int. Cl.² .......................................... E04D 1/00
[58] Field of Search ....... 52/514, 202, 509, 753 W, 52/357, 358, 98, 103

[56] References Cited
UNITED STATES PATENTS

| | | | |
|---|---|---|---|
| 2,020,875 | 11/1935 | Venzie | 52/357 |
| 3,349,533 | 10/1967 | Gregoire | 52/397 |
| 3,460,860 | 8/1969 | Stevens, Jr. | 52/71 X |
| 3,874,505 | 4/1975 | Mirarchi et al. | 52/514 X |

*Primary Examiner*—Price C. Faw, Jr.
*Assistant Examiner*—Carl D. Friedman
*Attorney, Agent, or Firm*—Pennie & Edmonds

[57] ABSTRACT

An attachment is disclosed for retaining a section of a repair panel within an opening defined by a portion of a hollow wall of the type constructed of modern day panels such as drywall, plasterboard, gypsumboard, and the like. The attachment comprises a body member with means on one side thereof to grip a marginal portion of the wallboard adjacent an opening configured to receive a replacement panel correspondingly configured and dimensioned to the opening. Panel support means in the form of a support seat is provided on the opposite side of the body member and configured and dimensioned such that when an attachment is secured along at least two opposed marginal portions of the wallboard adjacent the opening, the panel support means extends inwardly of the opening to support the replacement panel in nestled relation therewithin. In the preferred embodiment two attachments are positioned in adjacent relation along two opposed marginal portions of the wallboard opening. The invention relates to a unique method of repairing such hollow walls utilizing the unique attachment of the invention.

22 Claims, 8 Drawing Figures

ATTACHMENT FOR HOLLOW WALLS AND METHOD OF REPAIRING SAME

BACKGROUND OF THE INVENTION

1. Field of the Invention

This invention relates to attachments for hollow walls particularly suitable for use in repairing same according to the method which is made possible through the use of the attachment.

2. Description of the Prior Art

It is generally known that modern day building construction techniques have been increasingly directed toward the use of wallboard panels to construct walls and partitions. The wallboard materials generally used are commonly referred to as drywall, gypsumboard, plasterboard, etc. Certain of these materials are marketed under trademarks such as for example, SHEETROCK brand panels, by the United States Gypsum Company of Chicago, Ill. The wallboards are generally secured to studs which are suitably spaced according to local building codes.

While the construction techniques of such hollow walls has provided an increasing number of advantages, in practice, the resulting hollow walls have nevertheless presented certain disadvantages in maintainance and repairs. For example, to repair a damaged portion of wallboard occurring between two studs generally involves cutting and removing a relatively large section extending from stud to stud, and securing the end portions of a replacement panel to each stud. While this technqiue facilitates a repair of the damaged wall, it nevertheless is expensive and wasteful. In addition, the nature of such a repair requires that the repair panel be of a thickness identical to that of the existing wallboard so as to provide a continuous surface at the periphery of the repair. Also, since such drywall panels are not constructed to withstand substantial bending forces, the flexing of the wallboard repair panel between the studs presents a problem due to the absence of structural support means within the span. In most applications, since the stud-to-stud span is approximately 16 inches, this problem of panel flexibility can cause acute problems of discontinuity at the surfaces between the repair panel and the surrounding wall portions.

Several attempts have been made in the prior art to overcome these disadvantages. U.S. Pat. No. 2,997,416 to Helton relates to a Method and Apparatus for Repairing Wallboard of the type contemplated by the present invention. This patent relates to a relatively complex apparatus to secure wallboard repair panels in position within an opening including a backing plate 15 and a stem 21. The patent clearly illustrates the difficulties which have been encountered in repairing such hollow walls but does not disclose a practical solution for these problems. U.S. Pat. No. 3,717,970 to Rosenblum relates to a Wallboard Repair Device for patching holes in wallboard including two slidably connected pieces that can be locked together to form a flat, recessed backing support that is inserted into a trimmed hole in the wall. The Rosenblum patent also clearly illustrates the relative difficulty and complexity of prior art devices which have been developed with the increasing use of drywall wall panels. Neither of these patents disclose nor suggest an attachment for retaining a repair panel within an opening in a wallboard even similar to the attachment which we have invented.

U.S. Pat. No. 1,312,056 to Shaw relates to an ornamental panel or covering wherein a fastening strip is utilized to cover the ragged edges of panel materials formed of "insulite"sound deadening paperboard to provide an ornamental arrangement. U.S. Pat. No. 1,644,028 to Petersen relates to a Barn Batten which is used to cover crevices between adjacent barn boards and the like. U.S. Pat. No. 2,171,925 to Fitts relates to a spring-type Fastening Device adapted to secure in superposed relationship panel framings, supports or sheet structures. U.S. Pat. No. 2,174,145 to Tummins relates to a Wallboard Fastener for securing wallboards or panels to furring strips or other supporting framework. U.S. Pat. No. 2,239,173 to Madsen relates to a Double Glazed Window Structure which directs attention to a storm sash readily mountable on, or demountable from a window sash and to be effectively secured in place by weatherstrips. U.S. Pat. No. 2,379,179 to Petersen relates to a Joining and Cornering Strip to join and/or corner rigid or flexible boards without the necessity of drilling any holes or making any special preparation of the boards. U.S. Pat. No. 3,162,906 to Dudley relates to Separating Strips for Wall Joints which seal the joints between wall panels of plywood to prevent moisture from running or infiltering into the joints between adjacent panels. U.S. Pat. No. 3,445,972 to Carr relates to a Panel Assembly connected together by elongated expanded moldings. Neither of these patents disclose, nor relate to, an attachment for retaining a section of wallboard replacement panel in position with such simplicity and such accuracy, as the attachment and the unique method of repairing hollow walls which we have invented.

SUMMARY OF THE INVENTION

An attachment for retaining a section of wallboard replacement panel configured and dimensioned to substantially conform to an opening defined by a portion of wallboard which comprises a body member having means on one side to grip a marginal portion of the wallboard adjacent an opening configured to receive a replacement panel correspondingly configured and dimensioned to the opening. The attachment further comprises panel support means on the opposite side of the body member configured and dimensioned such that when at least one attachment is positioned along at least two opposed marginal portions of the opening of the wallboard, the panel support means extends inwardly of the opening in a manner to support the replacement panel in nestled relation therewithin. In its preferred embodiment the wallboard attachment is molded integrally of a resilient plastic material—preferably of ABS-styrene—and the wallboard gripping members on one side of the body member are capable of resiliently gripping marginal portions of wallboard adjacent an opening therein.

The body member preferably is of a plate-like configuration and the wallboard gripping means preferably comprise two spaced-apart plate-like gripping members configured and dimensioned to resiliently grip marginal portions of wallboard of a standard size, such as ⅝ inch plasterboard. To render the attachment capable of replacing sections of wallboard of other standard thickness, there is positioned between the plate-like gripping members, at least two pairs of elongated gripping members upstanding from the body member on the gripping side, and connected to the body member by a frangible portion. Each member of each pair of members is spaced progressively closer to a first plate-like member to resiliently accomodate gripping of other wallboards of standard thickness, such as ½ inch and ⅝ inch plasterboard. The provision of several pairs of frangible elongated gripping members makes it possible to modify the attachment insitu to secure it to plasterboard panels of several sizes depending upon the thickness of the wallboard under repair. The fact that the pairs of gripping members are elongated and that they have relatively reduced cross-sectional areas at their root portions makes it possible to secure them frangibly to the body member. Also, it is noted that while a maximum thickness of ⅝ inch wallboard is contemplated within the preferred embodiment of the invention, other maximum thicknesses — such as ¾ inch plasterboard — are also contemplated.

The wallboard attachment is primarily directed toward securing a repair panel in position within a wallboard opening. Thus when a damaged wallboard requires repair, it is advantageous to position the repair panel in face-to-face relation with the damaged wall portion and thereafter to trace the outline of the repair panel directly onto the wallboard. By cutting and removing the wallboard portion encompassed by the tracing, the repair panel will conform both dimensionally and in configuration, to the opening thus formed in the wallboard.

To retain the repair panel in position within the opening, a resilient panel retaining tab is provided in the preferred attachment. The retaining tab is dimensioned and pivotally positioned with respect to the body member such that when an attachment is positioned on a marginal portion of at least two opposed sides of an opening in a wallboard, positioning a correspondingly configured and dimensioned repair panel within the opening an adjacent side surface of the panel engages each retaining tab causing them to flex toward the body member and the reaction forces provided by the tabs on the side surfaces of the repair panel will retain the repair panel within the opening with considerable structural ability. In addition, by the provision of a transverse member having a knife edge portion on the free end of the retaining tab, and by utilizing a repair panel constructed of a material of sufficient softness to be penetrable by the knife edge portion, the retaining tab of the attachment will improve the structural capability of the repaired section so as to render it as least equivalent in strength to the unrepaired wall portions.

It will be seen that the thickness of the repair panel required to blend continuously with the outer wall surface portions is fixed by the dimension between the repair panel support means and the forwardmost portion of the body member. Thus it is possible to repair walls of several thicknesses utilizing a repair panel of a single thickness, thereby avoiding the need to obtain a repair panel of the precise thickness as the existing wallboard as it was necessary, particularly with stud-to-stud repairs of the prior art. In addition, this feature makes it possible to market the attachment as part of a kit having a repair panel of a single standard thickness which is usable with wallboards of several thicknesses.

Wallboards which are contemplated as repairable with the present invention include drywall panels which form modern day hollow walls such as plasterboard, gypsum board, or boards marketed under the registered trademark SHEETROCK by United States Gypsum Company of Chicago, Il. The repair panels contemplated for use with the invention may be constructed of the same materials as the wallboard under repair, or alternatively of a suitable readily available material such as compressed recycled newspapers which are relatively inexpensive and readily available. It is only necessary to provide a repair panel which will conform to the surrounding wall portions and will in addition, absorb compounds of the type generally applied to walls as, for example, spackling and other repair mixtures, wall paints, wallpaper, adhesives, etc.

The invention also relates to a unique method of repairing a damaged wallboard comprising taking a repair panel of sufficient area to encompass the damaged portion of the wallboard and positioning the panel in face-to-face relation with the damaged wallboard portion such that the periphery of the repair panel encompasses the damaged portion. The next step is to trace an outline of the repair panel onto the wallboard, and to remove the wallboard portion with a cutting instrument such as a toothed saw. At least two attachments are positioned in gripping relation onto marginal portions of opposed sides of the opening with the repair panel supporting and retaining means extending inwardly of the opening. The repair panel is then permanently positioned within the opening until its rear surface portions engage the support means of the wallboard attachments. The method further comprises forcibly positioning the repair panel within the opening while flexing the inwardly extending retaining tabs to provide a resilient force which resists movement of the panel out of the opening. The method further comprises applying a sealing compound such as spackling compound, paster of paris, or other sealing mixtures suitable for repairing walls. The sealing mixture iss permitted to dry and become hard. The sealing compound is applied by use of a spatula and when it has become fully hardened it may be smoothed and blended by rubbing an abrasive sandpaper over the repaired area.

The repair panel is preferably rectangular or square, but it can be seen that any required shape is contemplated by the invention without departing from its scope. Also, it will be seen that the repair technique disclosed herein is suitable for use where a section of wallboard extending from stud-to-stud is removed and replaced by a repair panel. Although the repair panel may be securely attached to the individual studs on each side, it is necessary to secure the remaining side portions of the repair panel to the surrounding wallboard portions. Accordingly, the attachment and the repair techniques disclosed herein are used to secure the unsupported sides of the repair panel to the surrounding wallboard portions.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
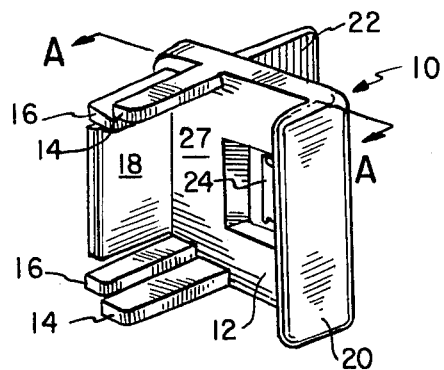
FIG. 1 is a perspective view of the attachment of the present invention.

Referring to the drawings and initially to FIG. 1, there is shown the attachment 10 constructed according to the invention. A plate-like body member 12 having parallel opposed faces 26 and 27, has wallboard gripping members 14, 16, 18 and 20 upstanding substantially perpendicularly to one side thereof and a panel support member 22 extending upwardly from, and substantially perpendicular to, the other side thereof. The panel support member 22 is positioned, configured and dimensioned to support a wallboard repair panel as will be described in greater detail. A repair panel resilient retaining member 24 is resiliently pivotally secured to the body member and extends upwardly at an acute angle with respect to the face 26 of the body member.

Figure 2:
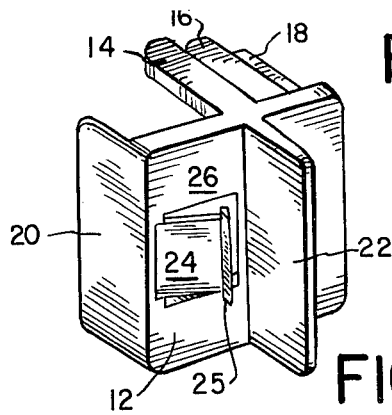
FIG. 2 is a perspective view of the attachment of FIG. 1 taken from the other side.
Figure 3:
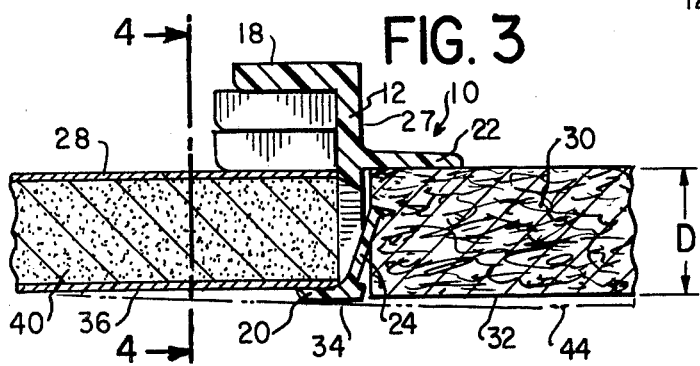
FIG. 3 is a cross-sectional view of the attachment of the present invention securing a repair panel within a wall opening, taken along lines 3—3 of FIG. 7.
Figure 4:
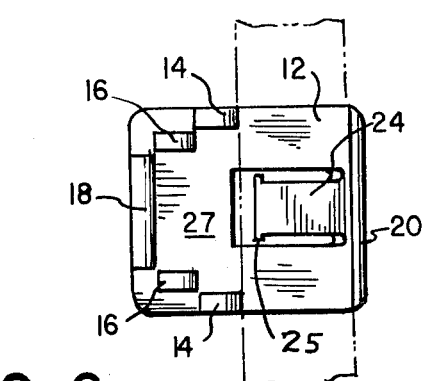
FIG. 4 is a view taken along lines 4—4 of FIG. 3.
Figure 5:
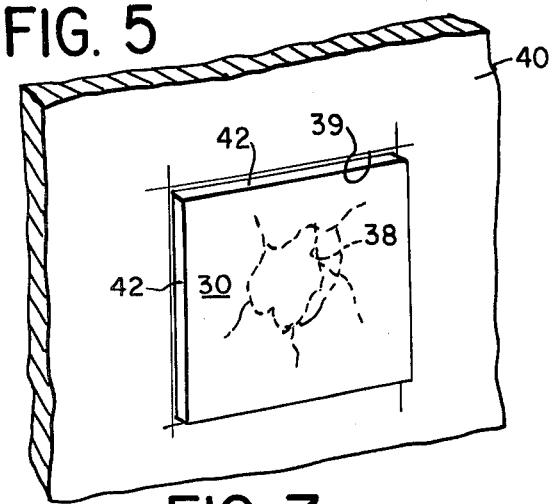
FIG. 5 is a fragmentary perspective view of a damaged wallboard portion illustrating the use of a repair panel as a template in accordance with the method of the invention.
Figure 6:
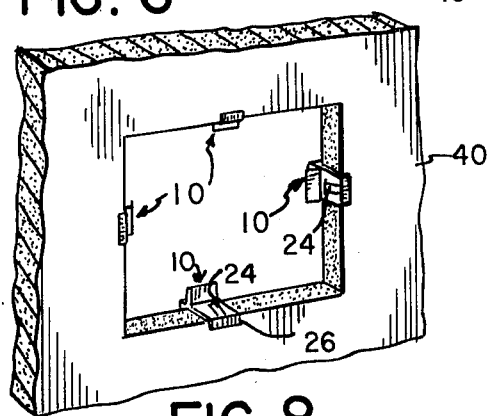
FIG. 6 is a fragmentary perspective view of the wallboard portion of FIG. 5 with the damaged portion removed and the attachments of the present invention positioned on marginal portions of the periphery of the opening.
Figure 7:
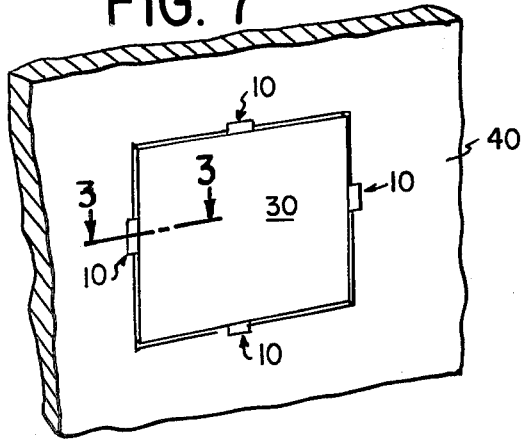
FIG. 7 is a fragmentary perspective view of the wallboard of FIG. 6 with the repair panel secured in position.

FIG. 2 is a view of the attachment 10 shown in FIG. 1 taken from the opposite side. FIG. 3 shows the attachment 10 of the invention in cross-section and positioned within a wallboard opening while securing a repair panel 30 which is nestled within the opening.

The attachment 10 is preferably molded integrally of a resilient plastic material and particularly of ABS styrene. The styrene contemplated is either a mechanical blend of butadiene-acrylonitrile rubbers with styrene-acrylonitrile resins. Alternately, it may be constructed of an ABS graft polymer formed by polymerizing the resin monomers, styrene and acrylonitrile in the presence of a rubbery polymer polybutadiene. Such plastic materials are particularly suitable for molding the attachments of the present invention, particularly because of their long term force carrying ability and creep resistance. However, other suitable resilient material contemplated by the invention include, metals or other plastic materials such as nylon, polypropylene, etc. In addition it is preferred that the material of the attachment of the invention be resilient to provide the preferred resilient gripping engagement of the attachment with the marginal wallboard portion defining the repair opening for repairing a wallboard in accordance with the method of the invention. It can be seen that the unique resilient wallboard gripping capability of the attachment 10, combined with the integral and compact repair panel retaining support members 24, and knife edge member 25, simplify the repair procedures of modern day hollow walls constructed of drywall panels to such an extent that they may be accomplished by even the most inexperienced layman.

FIGS. 5–8 illustrate the practice of the method of the invention. A wallboard repair panel 30, preferably of the type constructed of compressed recycled newspaper materials, is positioned in face-to-face relation with the damaged portion 38 of the wallboard 40 with the periphery of the panel encompassing the damaged area of the wallboard. An outline of the repair panel is traced onto the wallboard and correspondingly encompasses the damaged portion of the wallboard.

A toothed saw (not shown) is utilized to cut and remove the portion 39 of the wallboard 40 enclosed by the tracing of the repair panel 30. When the damaged wallboard section is removed the attachments 10 of the invention are positioned so as to resiliently grip a marginal portion of wallboard defining the opening along each side thereof. For a standard thickness ⅜ inch wallboard the attachment is secured so as to grip the marginal portion of the opening between grippings members 20 and 14 which — in the preferred embodiment are spaced apart approximately 0.365 inch, or slightly less than ⅜ inch to provide resilient gripping engagement of the marginal wall portion. For ½ inch wallboard, gripping members 14 are broken away along frangible section A—A in FIG. 1, leaving gripping members 16 which — in the preferred embodiment — are spaced from member 20 approximately 0.490 inch, or slightly less than ½ inch. For ⅝ inch dry wall, gripping members 16 are similarly broken away, leaving gripping members 18 which are preferably spaced from the plate-like gripping member 20 approximately 0.615 inch, or slightly less than ⅝ inch. The attachments should be positioned and spaced according to the particular wallboard; however in the preferred arrangement one attachment is positioned on a marginal portion of each side of the opening, or alternatively, two attachments are positioned on marginal portions of at least two opposed sides of the opening. The latter arrangement is preferred particularly for uneven wallboards since this relatively compact "four position" arrangement has been found to securely receive the panel in a stable nestled relation with the wallboard while avoiding pivoting or rocking motion of the panel caused by certain four point contact support arrangements. It is only necessary to the practice of the invention that at least one attachment be provided on a marginal portion of at least two opposite sides of the wallboard opening.

When the repair panel is securely positioned within the opening the outer surface portion of the repair panel 30 should be continuous or at least subsantially continuous with either the outer surface 34 of the attachement 10 or the outer surface 36 of the wallboard 28. This continuity is achieved, notwithstanding the thickness of the repair panel since the required repair panel thickness is determined by the dimension D between the panel support member 22 and the forward wallboard gripping member 20 as shown in FIG. 3. It should be noted that the repair panel may be of lesser thickness than the wallboard under repair, provided dimension D is predetermined to receive a repair panel of corresponding thickness to form a continuous outer surface with the outer surface portion of the surrounding wall.

Figure 8:
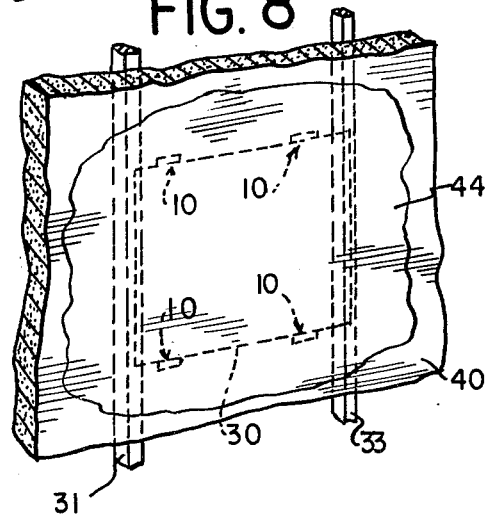
FIG. 8 is a fragmentary view of a wallboard similar to that of FIG. 7 repaired according to the method of the invention, but illustrating an alternate arrangement of wall attachments within the wall opening and alternate repair technique in which the repair panel extends from stud-to-stud.

A spackling compound mixture, 44, is applied uniformly over the repaired section and permitted to dry and harden as is shown in FIG. 8. The correct technique for applying the spackling compound is to apply the mixture with a spatula and thereafter utilize a trowelling action to provide a smooth and relatively continuously blended surface. The hardened surface is then made smooth and continuous by abrading the repaired section and surrounding portions with a suitably abrasive sandpaper.

Referring further to FIG. 8, the repair panel 30 and the attachments 10 are shown in dotted lines and are behind the spackling compound 44. The arrangement of the attachments 10 as shown in FIG. 8 illustrate an alternate arrangement as previously described, in which two attachments are positioned on two opposite side portions of the wallboard opening and provides certain advantages of stability over the embodiment of FIG. 6 as previously noted. However, either the arrangement of FIG. 6 or that of FIG. 8, or any other arrangements suitable to the particular wallboard under repair, are contemplated within the scope of the invention.

Also referring to FIG. 8 there is shown an alternate arrangement in which the repair panel extends from stud 31 to stud 33 (center to center) and secured thereto at each end. However the attachments of the present invention are utilized to support mid-portions of the panel in relation to the surrounding wallboard as shown in accordance with the method of the invention.

It can be readily seen from the foregoing description that the attachment and the method of the present invention so improve the repair techniques of modern day hollow dry walls of plasterboard and the like, that even the most inexperienced layman can repair a damaged wall in a manner which would have been difficult or even impossible according to the procedures of the prior art. The present invention contributes simplicity to wall repairs as hereinbefore described. In addition it provides an alternative to those individuals desiring to repair damaged walls in the best possible manner while avoiding the ever increasing costs to have such repairs made by skilled craftsmen. The attachment of the present invention is readily adaptable to be marketed in the form of a kit which contains for example: (1) the requisite number of wall attachments; (2) a patch repair panel preferably of the type constructed of compressed recycled newspaper materials and preferably having dimensions of 4 inches × 4 inches × ⅜inches; (3) a quantity of sandpaper; (4) a disposable saw; (5) a quantity of spackling compound; and (6) a disposable spatula. With a repair kit containing these materials, even the most inexperienced layman can repair a damaged wall in a manner which was previously not possible even by professional techniques of the prior art.

We claim:
1. An attachment for retaining a section of wallboard panel configured and dimensioned to substantially conform to an opening defined by a portion of wallboard which comprises:
  a. a body member;
  b. means on one side of said body member to grip a marginal portion of said wallboard adjacent an opening configured to receive a panel correspondingly configured and dimensioned to the opening;
  c. panel support means on the opposite side of said body member configured and dimensioned such that when at least one attachment is positioned along at least two opposed marginal portions of said opening of said wallboard said panel support means extends inwardly of said opening in a manner to support said panel in nestled relation therewithin;
  d. said body member is comprised of a substantially plate-like member having substantially parallel opposed faces and said panel support means is configured and dimensioned to support a replacement repair panel in nestled relation with the opening of said wallboard;
  e. said means on said body member to grip marginal portions of said wallboard opening comprises at least two wallboard gripping members extending upwardly away from a first face of said body member and spaced from each other sufficiently to at least grippingly secure the attachment to a marginal portion of said opening at least sufficient to maintain the attachment in said position;
  f. said wallboard gripping members are comprised of at least one plate-like member extending away from said first face of said body member and a first pair of spaced elongated gripping members extending upwardly away from said body member and spaced from said plate-like gripping member by a distance sufficiently less than a first thickness of a standard wallboard panel sufficient to provide gripping engagement of said attachment to said wallboard panel between said first gripping member and said first pair of gripping members, at least at three positions of contact between the first gripping member and the first pair of spaced gripping members; and
  g. said first pair of elongated gripping members are frangibly secured to said plate-like body member and said means on said body member to grip marginal portions of said wallboard opening further comprises a second pair of elongated gripping members extending upwardly away from said first face of said body member and spaced from said plate-like gripping member a distance greater than said first pair of elongated gripping members, but sufficiently less than a second standard wallboard thickness such that the attachment is securable to a marginal portion of said wallboard opening by removing said first pair of gripping members along said frangible portions and securely gripping said wallboard portion between said plate-like gripping member and said second pair of elongated gripping members.

2. The attachment according to claim 1 wherein said body member and said wallboard gripping members are constructed of a resilient material and said panel supporting means is spaced from the forward position of the body member by a fixed dimension which determines the thickness of the repair panel required to provide continuity between the outer surface thereof and the outer surface of the surrounding wallboard portions when the repair panel is positioned within said opening.

3. The attachment according to claim 2 wherein said body member and said wallboard gripping members are molded of a plastic material.

4. The attachment according to claim 3 wherein said means on the opposite side of said body member to support a repair panel within said wallboard opening comprises a plate-like member secured to, and upstanding from, the second face of said body member such that when the attachment is secured to a marginal portion of a wallboard opening, the panel support member extends inwardly toward the central portion of the wallboard opening.

5. The attachment according to claim 4 further comprising a resilient tab member resiliently secured at one end to said body member and extending upwardly at an acute angle to and away from said second face of said body member toward the central portion of said wallboard opening when the attachment is positioned along a marginal portion of the wall opening, said resilient tab being so configured and positioned such that positioning a correspondingly dimensioned and configured wallboard repair panel within said wallboard opening forcibly engages said resilient tab causing resilient pivotal movement of the tab away from the central portion of the opening and the resilient engagement between the free end portion of said tab member and said repair panel provides an inward retaining force to retain the repair panel within said wallboard opening.

6. The attachment according to claim 5 wherein said resiliently pivotally attached tab member further comprises means at the free end portion to at least partially penetrate the side surface portion of a wall repair panel when said repair panel is positioned within said opening defined by the wallboard and said resilient tab member is resiliently and forceably pivoted away from the central portion of the opening.

7. The attachment according to claim 6 wherein said means to penetrate the side surface portion of the repair panel comprises a transverse member secured to the free end portion of said resilient tab member and having a knife edge portion positioned and configured to resiliently penetrate the adjacent side surface portion of a correspondingly configured and dimensioned repair panel positioned within said opening when at least one attachment is gripped to at least two opposed side portions of said opening.

8. The attachment according to claim 7 wherein said second pair of elongated gripping members are frangibly secured to said plate-like body member and said means on said body member to grip marginal portions of said wallboard opening further comprises a second plate-like wallboard gripping member secured to and extending away from said first face of said body member and spaced from said first plate-like gripping member greater than said second pair of elongated wallboard gripping members but sufficiently less than a third standard wallboard thickness such that the attachment is securable to a marginal portion of said wallboard opening by removing said first and second pairs of elongated gripping members along said frangible portions and securely gripping said wallboard portion between said first and second plate-like gripping members.

9. The attachment according to claim 8 wherein said resilient plastic material is at least one of ABS styrene, polypropylene and nylon.

10. The attachment according to claim 9 wherein said repair panel support member and said wallboard gripping members are each substantially perpendicular to the surface of the body member from which they extend.

11. The attachment according to claim 10 wherein said first plate-like member and said first pair of elongated gripping members are spaced sufficient to grip a portion of a wallboard of approximately ⅜ inch thickness, said first plate-like gripping member and said second pair of elongated gripping members are spaced sufficient to grip a portion of a wallboard of approximately ½ inch thickness, and said first and second plate-like gripping members are spaced sufficient to grip a portion of a wallboard of approximately ⅝ inch thickness.

12. An attachment for retaining a wallboard repair panel within an opening defined by a portion of wallboard which comprises:

a. plate-like body member having first and second substantially parallel opposed faces;

b. means on one side of said body member to grip marginal portions of wallboard defining an opening configured to receive a repair panel correspondingly dimensioned and configured to be received in nestled relation within said opening including:

1. a first plate-like wallboard gripping member secured to, and extending away from a first face of said body member;

2. a first pair of elongated wallboard gripping members secured at a frangible root portion to the first face of said body member and spaced from said first plate-like member sufficiently less than a first standard thickness wallboard to resiliently grip therebetween a marginal portion of said wallboard adjacent said opening;

3. a second pair of gripping members secured at a frangible root portion to said first face of said body member and spaced from said first plate-like member greater than said first pair of elongated gripping members, but sufficiently less than a second standard wallboard thickness such that the attachment is securable to a marginal portion of said wallboard opening of said second thickness by removing said first pair of frangible elongated gripping members along the root portions and thereafter gripping a wallboard portion therebetween;

4. a second plate-like gripping member secured to, and extending upwardly from said first face of said body member and spaced from said first plate-like member greater than said second pair of elongated gripping members, but sufficiently less than a third standard wallboard thickness such that the attachment is securable to marginal portion of an opening defined by a wallboard of said third thickness by removing said second pair of frangible gripping members along the root portions and thereafter gripping said wallboard portion within the space defined by said first and second plate-like gripping members;

c. a plate-like repair panel retaining seat secured to and extending upwardly from the second face of said body member, said seat being dimensioned and spaced from the forward position of the body member to engageably support a correspondingly configured and dimensioned repair panel of predetermined thickness in continuous nestled relation within said wallboard opening when at least one attachment is grippingly positioned along a marginal portion of at least two opposed side portions of said opening; and d. a retaining tab resiliently pivoted on said body member and extending upwardly at an acute angle from said second face of said body member and being positioned such that upon positioning a repair panel within an opening having at least one attachment grippingly positioned along marginal portions of at least two opposed side portions thereof, side surface portions of said repair panel engage said retaining tabs while causing them to resiliently pivot toward said body member, and the resilient engagement of said tab against the adjacent side surface of said repair panel retains said repair panel in position within said opening.

13. The attachment according to claim 12 wherein said repair panel retaining tab further comprises a knife-edge member transversely positioned at the free end thereof in a manner to at least partially penetrate an adjacent side surface portion of said repair panel when said repair panel is positioned within the opening defined by the wallboard, the resilient engageable force of said retaining tab thereby retaining said repair panel against movement out of said opening even upon the application of forces at least approximately equivalent to the force capability of unrepaired wallboard portions.

14. An attachment for retaining a section of wallboard panel configured and dimensioned to substantially conform to an opening defined by a portion of wallboard which comprises:
   a. a body member;
   b. means on one side of said body member comprising two wallboard gripping members one of which is a plate-like gripping member and the other of which is a first gripping member which together define a first pair of gripping members, and at least one frangible gripping means being removable from said body and spaced from the plate-like gripping member defining therewith a second gripping pair being spaced apart by a distance less than the first pair of gripping members, each gripping pair being adapted to resiliently grip preselected marginal portion thicknesses of correspondingly dimensioned wallboards adjacent an opening configured to receive a panel correspondingly configured and dimensioned to the opening; and
   c. panel support means on the opposite side of said body member configured and dimensioned such that when at least one attachment is positioned along at least two opposed marginal portions of said opening of said wallboard said panel support means extends inwardly of said opening in a manner to support said panel in nestled relation therewith.

15. The attachment according to claim 14 wherein said body member is comprised of a substantially plate-like member having substantially parallel opposed first and second faces and said panel support means is configured and dimensioned to support a replacement repair panel in nestled relation within the opening of said wallboard.

16. The attachment according to claim 15 wherein said first pair of gripping members extend upwardly away from the first face of said body member and are spaced from each other sufficiently to at least grippingly secure the attachment to a marginal portion of an opening in a first standard thickness wallboard whenever said frangible gripping means has been removed from said body portion.

17. The attachment according to claim 15 wherein said second gripping pair are spaced apart sufficiently to at least grippingly secure the attachment to a marginal portion of an opening in a second standard thickness wallboard.

18. The attachment according to claim 17 wherein said frangible gripping means is comprised of a pair of spaced elongated gripping members which extend upwardly away from said first face of said body member.

19. The attachment according to claim 15 wherein said means on the opposite side of said body member to support a repair panel within said wallboard opening comprises a plate-like member secured to, and upstanding from, the second face of said body member such that when the attachment is secured to a marginal portion of a wallboard opening, the panel support member extends inwardly toward the central portion of the wallboard opening.

20. The attachment according to claim 19 further comprising a resilient tab member resiliently secured at one end to said body member and extending upwardly at an acute angle to and away from said second face of said body member toward the central portion of said wallboard opening when the attachment is positioned along a marginal portion of the wall opening, said resilient tab being so configured and positioned such that positioning a correspondingly dimensioned and configured wallboard repair panel within said wallboard opening forcibly engages said resilient tab causing resilient pivotal movement of the tab away from the central portion of the opening and the resilient engagement between the free end portion of said tab member and said repair panel provides an inward retaining force to retain the repair panel within said wallboard opening.

21. The attachment according to claim 20 wherein said resiliently pivotally attached tab member further comprises means at the free end portion to at least partially penetrate the side surface portion of a wall repair panel when said repair panel is positioned within said opening defined by the wallboard and said resilient tab member is resiliently and forcibly pivoted away from the central portion of the opening.

22. The attachment according to claim 21, wherein said means to penetrate the side surface portion of the repair panel comprises a transverse member secured to the free end portion of said resilient tab member and having a knife edge portion positioned and configured to resiliently penetrate the adjacent side surface portion of a correspondingly configured and dimensioned repair panel positioned within said opening when at least one attachment is gripped to at least two opposed side portions of said opening.

* * * * *